United States Patent
Fukasawa et al.

(10) Patent No.: US 7,047,740 B2
(45) Date of Patent: May 23, 2006

(54) BOOST PRESSURE ESTIMATION APPARATUS FOR INTERNAL COMBUSTION ENGINE WITH SUPERCHARGER

(75) Inventors: Osamu Fukasawa, Nagoya (JP); Hideki Obayashi, Okazaki (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/048,884

(22) Filed: Feb. 3, 2005

(65) Prior Publication Data

US 2005/0172628 A1 Aug. 11, 2005

(30) Foreign Application Priority Data

Feb. 9, 2004 (JP) ............... 2004-032692

(51) Int. Cl.
*F02D 23/00* (2006.01)
(52) U.S. Cl. .......................... 60/602; 60/600
(58) Field of Classification Search ................ 60/600, 60/601, 602, 603, 611
See application file for complete search history.

(56) References Cited

U.S. PATENT DOCUMENTS

| | | | | |
|---|---|---|---|---|
| 4,466,248 A | * | 8/1984 | Nartowski | .............. 60/602 |
| 5,155,998 A | * | 10/1992 | Monden | .............. 60/602 |
| 5,191,789 A | | 3/1993 | Furuya | .............. 73/118.2 |
| 6,138,648 A | * | 10/2000 | Zentgraf | .............. 123/563 |
| 6,279,551 B1 | * | 8/2001 | Iwano et al. | .............. 60/611 |
| 6,497,227 B1 | * | 12/2002 | Wang et al. | .............. 60/602 |
| 6,698,203 B1 | * | 3/2004 | Wang | .............. 60/602 |
| 6,779,344 B1 | * | 8/2004 | Hartman et al. | .............. 60/602 |
| 6,804,601 B1 | * | 10/2004 | Wang et al. | .............. 60/602 |
| 6,850,833 B1 | * | 2/2005 | Wang et al. | .............. 60/602 |
| 6,886,335 B1 | * | 5/2005 | Tabata et al. | .............. 60/602 |

FOREIGN PATENT DOCUMENTS

| JP | 7-332097 | 12/1995 |
|---|---|---|
| JP | 2002-180889 | 6/2002 |

\* cited by examiner

*Primary Examiner*—Sheldon J. Richter
(74) *Attorney, Agent, or Firm*—Nixon & Vanderhye PC

(57) ABSTRACT

An opening is provided for an exhaust bypass pipe that bypasses an exhaust turbine of an exhaust turbine supercharger. According to the opening, an exhaust gas amount bypassing the exhaust turbine is calculated. An exhaust gas amount supplied to the exhaust turbine is found by subtracting the waste-gate-valve-passing gas amount from an intake air amount (exhaust gas amount) detected by the air flow meter. A rotational speed of the exhaust turbine is calculated from this turbine-supplied gas amount. An estimated boost pressure is calculated from this rotational speed of the exhaust turbine. Consequently, a boost pressure can be accurately estimated without using a boost pressure sensor even under such conditions as to disable detection of boost pressures or degrade the detection accuracy in a system using a conventional boost pressure sensor.

20 Claims, 14 Drawing Sheets

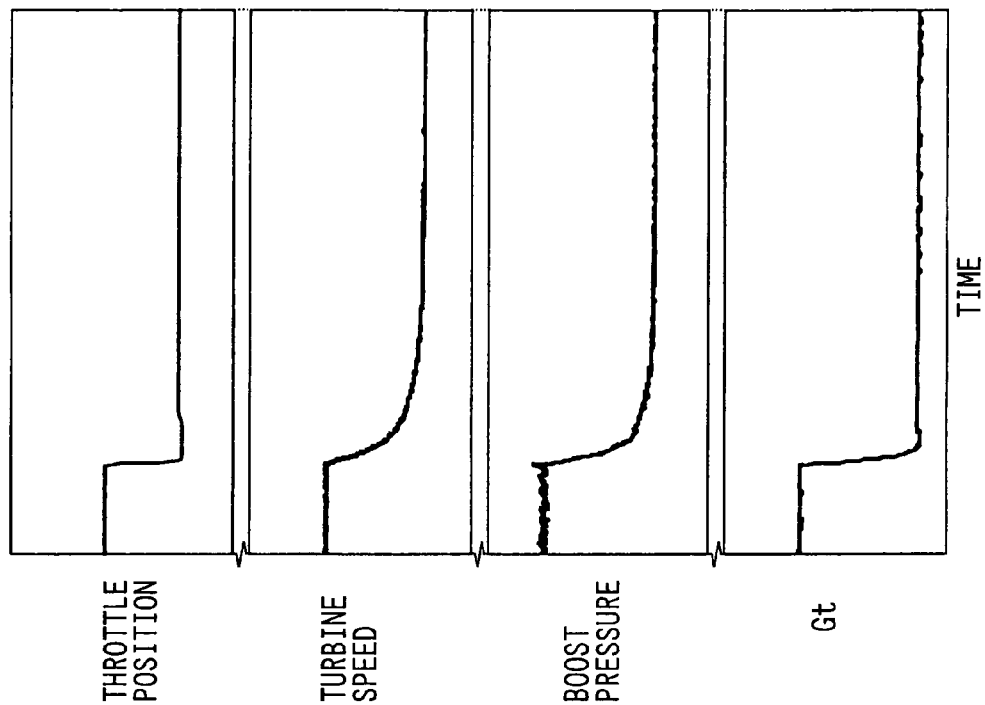
FIG. 16B DECELERATION
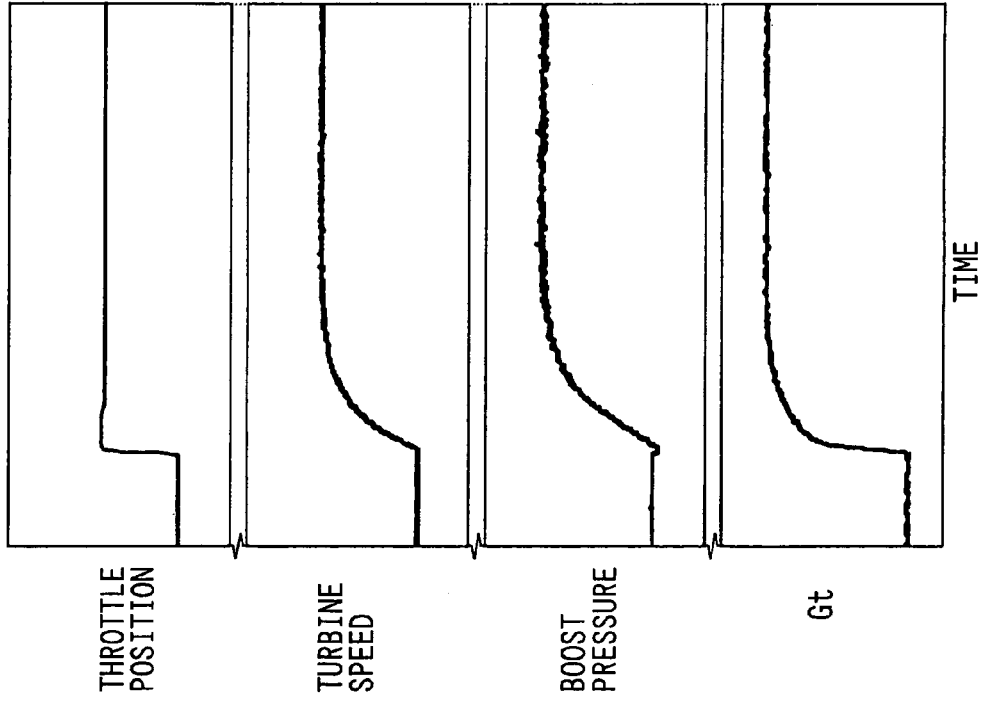
FIG. 16A ACCELERATION

BOOST PRESSURE ESTIMATION APPARATUS FOR INTERNAL COMBUSTION ENGINE WITH SUPERCHARGER

CROSS-REFERENCE TO RELATED APPLICATION

This application is based on Japanese Patent Application No. 2004-32692 filed on Feb. 9, 2004, the disclosure of which is incorporated herein by reference.

FIELD OF THE INVENTION

The present invention relates to a boost pressure estimation apparatus for an internal combustion engine with a supercharger, which estimates a boost pressure of the supercharger.

BACKGROUND OF THE INVENTION

Conventionally, some internal combustion engines for vehicles are equipped with an exhaust turbine supercharger (so-called turbocharger) to obtain high power. Generally, an exhaust turbine supercharger has the following construction. An exhaust turbine is provided within an exhaust pipe of the internal combustion engine and is connected to a compressor provided on an intake pipe. Kinetic energy of exhaust gas is used to rotatively drive the exhaust turbine. In this manner, the compressor is rotatively driven to supply intake air.

The technology to control boost pressures of the supercharged internal combustion engine is described in JP-A-1995-332097 as follows, for example. A waste gate valve is provided on an exhaust bypass pipe that bypasses an exhaust turbine. A boost pressure sensor detects a boost pressure that should match a target boost pressure. For this purpose, the waste gate valve opening is feedback-controlled to control the amount of exhaust gas supplied to the exhaust turbine. This controls rotational speeds of the exhaust turbine and the compressor to control boost pressures.

Japanese Patent No. 2528384 describes a supercharged internal combustion engine as follows. A boost pressure sensor detects boost pressures. Based on the boost pressures, the supercharged internal combustion engine corrects the intake air amount detected by an air flow meter. This improves the detection accuracy of the intake air amount during supercharging.

JP-A-2002-180889 describes a supercharged internal combustion engine as follows. The super charged internal combustion engine calculates intake temperatures after supercharging using a map and the like. The calculation is based on an intake temperature and an intake pressure (atmospheric pressure) before supercharging and a boost pressure detected by a boost pressure.

However, the above-mentioned conventional technologies control boost pressures based on detection values for the boost pressure sensor. Alternatively, the technologies calculate intake air amounts and intake temperatures based on detection values from the boost pressure sensor. Depending on cases, the boost pressure sensor may fail or degrade the detection accuracy. Under such usage environment or operating conditions, it is necessary to inhibit control or processes based on detection values from the boost pressure sensor. It becomes impossible to provide control or processes based on boost pressures. Since the boost pressure sensor must be always provided, the number of parts increases to increase costs.

SUMMARY OF THE INVENTION

The present invention has been made in consideration of the foregoing. It is therefore an object of the present invention to provide a supercharged internal combustion engine's boost pressure estimation apparatus capable of accurately estimating boost pressures without using a boost pressure sensor even under such conditions as to disable detection of boost pressures or degrade the detection accuracy in a system using a conventional boost pressure sensor, enabling control and processes based on boost pressures, and eliminating a boost pressure sensor to satisfy demands for decreasing the number of parts and reducing costs.

To achieve the above-mentioned object, the present invention provides a supercharged internal combustion engine's boost pressure estimation apparatus in a supercharging system comprising a supercharger and a waste gate valve. The supercharger uses an exhaust pressure to drive an exhaust turbine provided for an exhaust pipe of an internal combustion engine and drives a compressor provided for an intake pipe to supply air into a cylinder. The waste gate valve opens and closes an exhaust bypass pipe to bypass the exhaust turbine. Turbine-supplied gas amount calculation means calculates an exhaust gas amount supplied to the exhaust turbine (hereafter referred to as a "turbine-supplied gas amount") based on an intake air amount detected by the means for detecting intake air amount and opening of the waste gate valve. Boost pressure estimation means calculates an estimated value of the supercharger's boost pressure (hereafter referred to as an "estimated boost pressure") based on the turbine-supplied gas amount.

Generally, the intake air amount of an internal combustion engine approximately equals the exhaust gas amount. When the waste gate valve opens, the exhaust gas flows separately along a pipe supplied to the exhaust turbine and a pipe passing through the waste gate valve by bypassing the exhaust turbine. The sum of a turbine-supplied gas amount (the exhaust gas amount supplied to the exhaust) and the amount of gas passing through the waste gate valve (the exhaust gas amount bypassing the exhaust turbine 26) becomes approximately equivalent to the intake air amount (exhaust gas amount).

$$\text{Intake air amount} = \text{Turbine-supplied gas amount} + \text{Amount of gas passing through the waste gate valve} \quad (1)$$

In this case, the amount of gas passing through the waste gate valve varies with the opening of the waste gate valve. Accordingly, the turbine-supplied gas amount can be accurately calculated by using the intake air amount and the opening of the waste gate valve. Depending on the turbine-supplied gas amount, the exhaust turbine's rotational speed (compressor's rotational speed) changes to change the boost pressure. The boost pressure estimation method according to the present invention can accurately estimate the boost pressure by using the turbine-supplied gas amount. A boost pressure can be accurately estimated without using the boost pressure sensor even under such conditions as to disable detection of boost pressures or degrade the detection accuracy in a system using a conventional boost pressure sensor. It is possible to provide control and processes based on boost pressures. Further, the boost pressure sensor can be omitted from the construction. It is also possible to satisfy demands for decreasing the number of parts and reducing costs.

BRIEF DESCRIPTION OF THE DRAWINGS

FIG. 16A is a time chart showing the behavior of boost pressure during acceleration;

FIG. 16B is a time chart showing the behavior of boost pressure during deceleration;

DETAILED DESCRIPTION OF THE PREFERRED EMBODIMENTS

The following describes the best mode for carrying out the present invention using the following embodiments 1 through 3.

[Embodiment 1]

Embodiment 1 of the present invention is described with reference to FIGS. 1 through 7.

Figure 1:
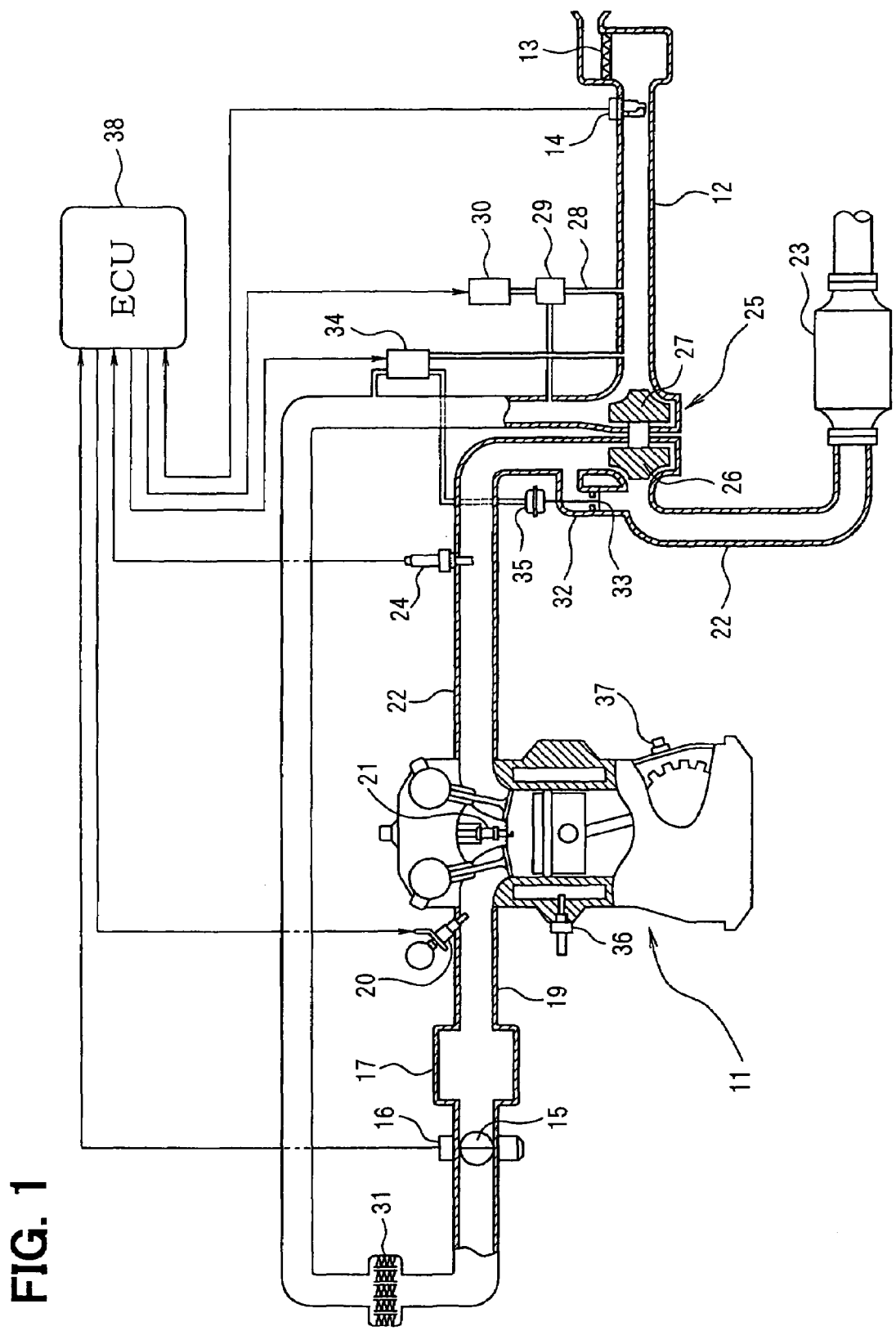
FIG. 1 schematically shows the overall construction of an engine control system according to embodiment 1 of the present invention.

An overall construction of the engine control system is described with reference to FIG. 1. An air cleaner 13 is provided at the highest upstream of an intake pipe 12 (intake pipe) of an engine 11 as an internal combustion engine. The downstream of the air cleaner is provided an air flow meter 14 (means for detecting intake air amount) that detects the amount of intake air. The downstream of the air flow meter 14 is provided with a throttle valve 15 and a throttle opening sensor 16. A DC motor or the like is used to adjust the opening of the throttle valve 15. The throttle opening sensor 16 detects the throttle opening.

Further, a surge tank 17 is provided at the downstream of the throttle valve 15. The surge tank 17 is provided with an intake manifold 19 that introduces air into each cylinder of the engine 11. A fuel injection valve 20 to inject fuel is attached near an intake port of each cylinder's intake manifold. An ignition plug is attached to a cylinder head of the engine 11 for each cylinder. Spark discharge from each ignition plug 21 ignites air-fuel mixture in the cylinder.

An exhaust pipe 22 (exhaust pipe) of the engine 11 is provided with catalyst 23 such as three-way catalyst to purify CO, HC, NOx, and the like in exhaust gas. The upstream of the catalyst 23 is provided with an air-fuel ratio sensor 24 to detect an air-fuel ratio in the exhaust gas.

The engine 11 is further provided with an exhaust turbine supercharger 25. The supercharger 25 is provided with an exhaust turbine 26 between the air-fuel ratio sensor 24 and the catalyst 23 along the exhaust pipe 22. A compressor 27 is provided between the air flow meter 14 and the throttle valve 15 along the intake pipe 12. The supercharger 25 rotatively drives the compressor 27 to supercharge intake air. For this purpose, the exhaust turbine 26 is coupled to the compressor 27. Kinetic energy of the exhaust gas rotatively drives the exhaust turbine 26.

Further, the intake pipe 12 is provided with an intake bypass pipe 28 to bypass the compressor 27. In the middle of the intake bypass pipe 28, an air bypass valve (hereafter referred to as "ABV") 29 is provided to open and close the intake bypass pipe 28. A vacuum switching valve for ABV (hereafter referred to as "VSV for ABV") 30 is controlled to control opening of the ABV 29. An inter-cooler (hereafter referred to as "IC") 31 is provided between the compressor 27 and the throttle valve 15 along the intake pipe 12 to cool intake air pressurized by the supercharger 25.

The exhaust pipe 22 is provided with an exhaust bypass pipe 32 to bypass the exhaust turbine 26. In the middle of the exhaust bypass pipe 32, a waste gate valve (hereafter referred to as "WGV") 33 is provided to open and close the exhaust bypass pipe 32. Opening of the WGV 33 is controlled by controlling a vacuum switching valve for WGV (hereafter referred to as "VSV for WGV") to control a diaphragm-type actuator 35.

A cylinder block of the engine 11 is provided with a cooling water temperature sensor 36 and a crank angle sensor 37. The cooling water temperature sensor 36 detects cooling water temperature. The crank angle sensor 37 outputs a pulse signal each time a crankshaft of the engine 11 rotates at a specified crank angle. Crank angles and engine's rotational speeds are detected based on output signals from the crank angle sensor 37.

Outputs from these various sensors are input to an engine control unit (hereafter referred to as "ECU") 38. The ECU 38 mainly comprises a microcomputer. The ECU 38 executes various engine control programs stored in RAM (storage medium) to control the fuel injection amount of the fuel injection valve 20 and the ignition timing of the ignition plug 21.

Figure 2:
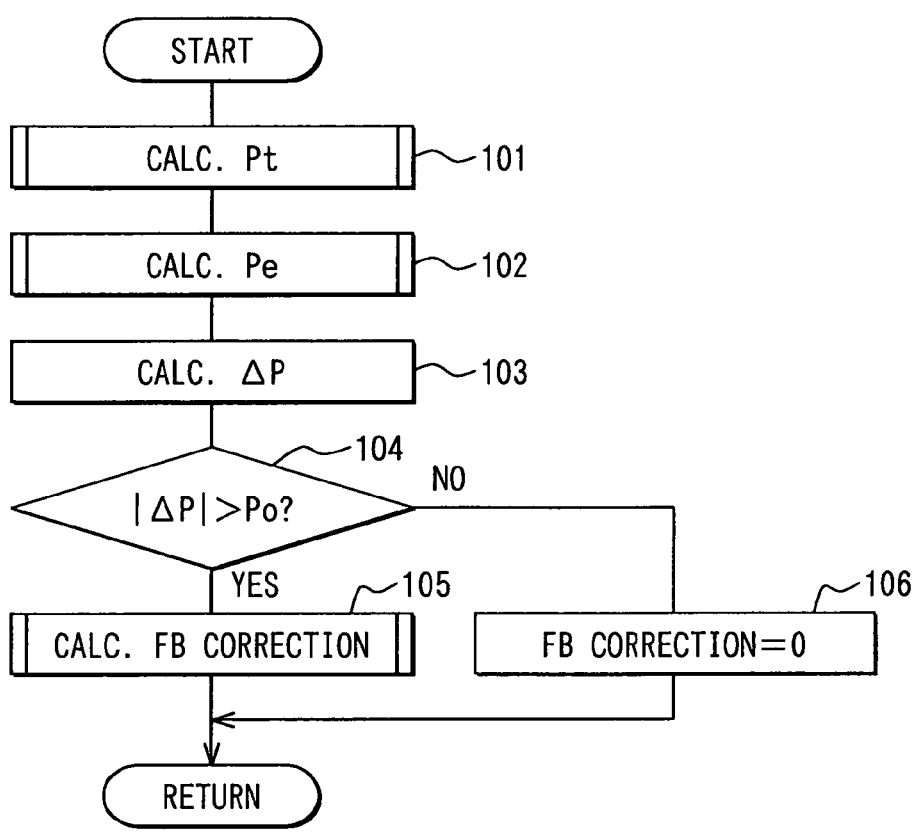
FIG. 2 is a flowchart showing a process flow of a boost pressure FB control routine according to embodiment 1.
Figure 3:
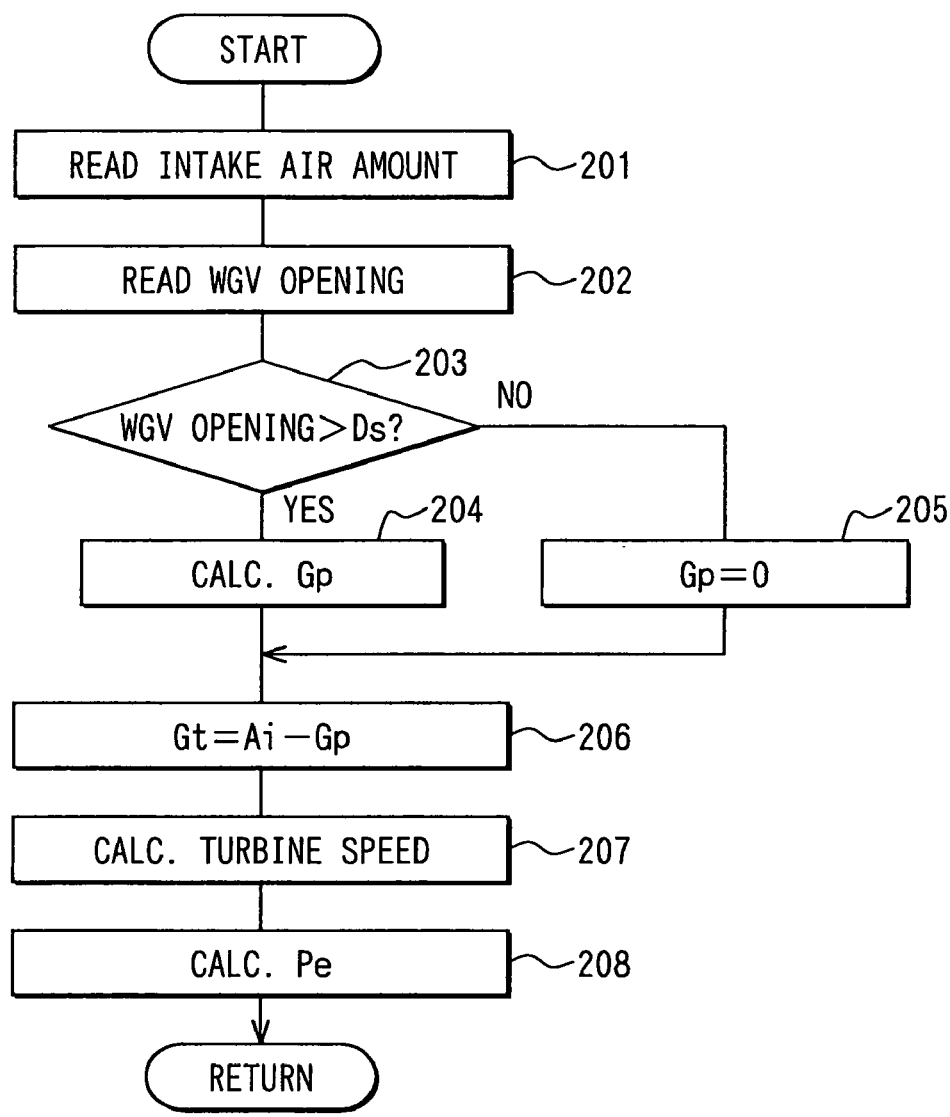
FIG. 3 is a flowchart showing a process flow of a boost pressure estimation routine according to embodiment 1.

The ECU 38 executes boost pressure control routines in FIGS. 2 and 3 to calculate an estimated boost pressure Pe (an estimated value of the intake air pressure generated by the supercharger 25). The ECU 38 feedback controls the opening of the WGV 33 so that the estimated boost pressure Pe matches the target boost pressure Pt. In this manner, the ECU 38 controls the amount of exhaust gas supplied to the exhaust turbine 26. The ECU 38 controls revolutions of the exhaust turbine 26 and the compressor 27 to control the boost pressure.

The estimated boost pressure Pe is calculated as follows. Generally, the intake air amount Ai of the engine 11 approximately equals its exhaust gas amount. When the WGV 33 opens, the exhaust gas flows separately along a pipe supplied to the exhaust turbine 26 and a pipe passing through the WGV 33 by bypassing the exhaust turbine 26. The sum of a turbine-supplied gas amount (the exhaust gas amount supplied to the exhaust 26) and the WGV-passing gas amount Gp (the exhaust gas amount bypassing the exhaust turbine 26) becomes approximately equivalent to the intake air amount Ai (exhaust gas amount).

$$\text{Intake air amount } Ai = \text{Turbine-supplied gas amount} + WGV\text{-passing gas amount } Gp \qquad (2)$$

In this case, the WGV-passing gas amount Gp varies with the opening of the WGV 33. The ECU 38 calculates the WGV-passing gas amount Gp according to the opening of the WGV 33. The ECU finds the turbine-supplied gas amount by subtracting the WGV-passing gas amount Gp from the intake air amount Ai (exhaust gas amount) detected by the air flow meter 14.

$$\text{Turbine-supplied gas amount} = \text{Intake air amount } Ai - WGV\text{-passing gas amount } Gp \qquad (3)$$

Rotational speeds of the exhaust turbine 26 and the compressor 27 vary with the turbine-supplied gas amount to change boost pressures. The ECU 38 uses the turbine-supplied gas amount to calculate the exhaust turbine's rotational speed. The ECU 38 uses the exhaust turbine's rotational speed to calculate an estimated boost pressure Pe.

The following describes process contents of the boost pressure control routines in FIGS. 2 and 3. The ECU 38 executes these routines.

[Boost Pressure FB Control Routine]

Figure 4:
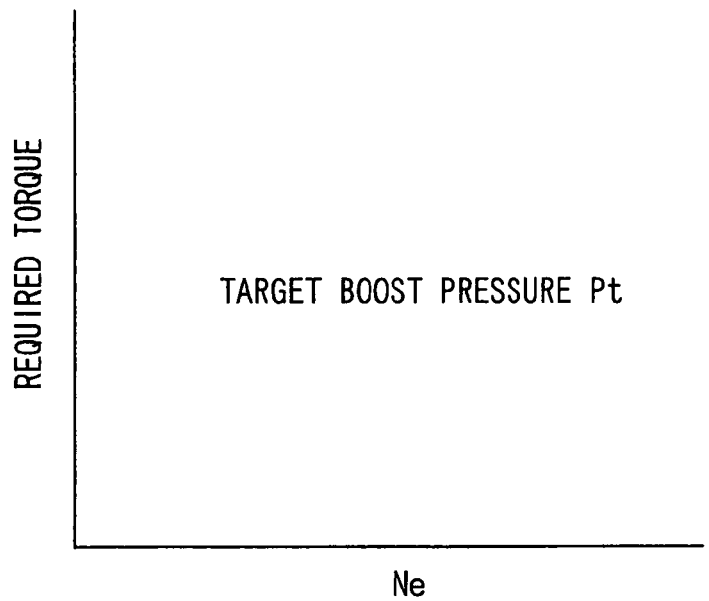
FIG. 4 schematically shows a target boost pressure map.

The boost pressure FB control routine in FIG. 2 is executed at a specified cycle during engine operations. The routine works as boost pressure control means as described in the appended claims. When initiated, the program executes a target boost pressure calculation routine (not shown) at Step 101. By doing so, the program uses maps, equations, and the like for the target boost pressure Pt as shown in FIG. 4 to calculate the target boost pressure Pt corresponding to engine operation states (e.g., engine's rotational speed, requested torque, cooling water temperature, and the like).

The program proceeds to Step 102 and executes a boost pressure estimation routine to be described with reference to FIG. 3. The program calculates the estimated boost pressure Pe based on the intake air amount Ai detected by the air flow meter 14 and the opening of the WGV 33.

The program proceeds to Step 103 to calculate deviation ΔP between the target boost pressure Pt and the estimated boost pressure Pe. The program proceeds to Step 104 to determine whether or not an absolute value of deviation ΔP between the target boost pressure Pt and the estimated boost pressure Pe is larger than a specified value.

As a result, it may be determined that the absolute value of deviation ΔP between the target boost pressure Pt and the estimated boost pressure Pe is larger than a specified value Po. In this case, the program proceeds to Step 105 to execute a feedback control routine (not shown). The program calculates a feedback correction amount (hereafter referred to as an "FB correction amount") based on deviation ΔP between the target boost pressure Pt and the estimated boost pressure Pe). Using this FB correction amount, the program feedback controls (hereafter referred to as "FB controls") the opening of the WGV 33 so that the estimated boost pressure Pe matches the target boost pressure Pt. In this manner, the program controls the turbine-supplied gas amount to control the rotational speed of the exhaust turbine 26 (the rotational speed of the compressor 27) and control the boost pressure.

At the above-mentioned Step 104, it may be determined that the absolute value of deviation ΔP between the target boost pressure Pt and the estimated boost pressure Pe is smaller than or equal to a specified value Po. In this case, The actual boost pressure is assumed to be controlled near the target boost pressure Pt. The program proceeds to Step 106 to set the FB correction amount to 0. In this case, the opening of the WGV 33 remains unchanged.

[Boost Pressure Estimation Routine]

The following describes process contents of a boost pressure estimation routine as shown in FIG. 3. This routine is executed at Step 102 of the boost pressure FB control routine in FIG. 2. When initiated, at Step 201, the routine first reads the intake air amount Ai detected by the air flow meter 14. The routine proceeds to Step 202 to read the opening of the WGV 33. As information alternative to the opening of the WGV 33, the routine may read a control duty value of a VSV 34 for WGV, for example.

Figure 5:
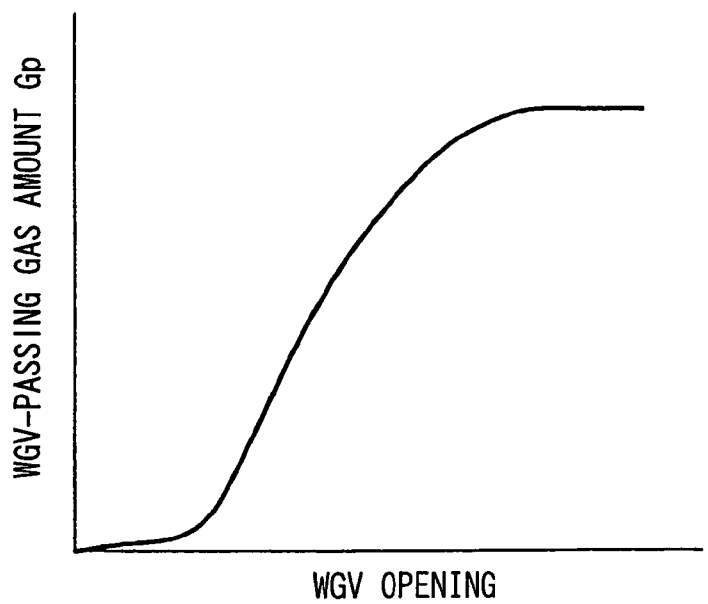
FIG. 5 schematically shows a map indicating the amount of gas passing through a WGV.
Figure 6:
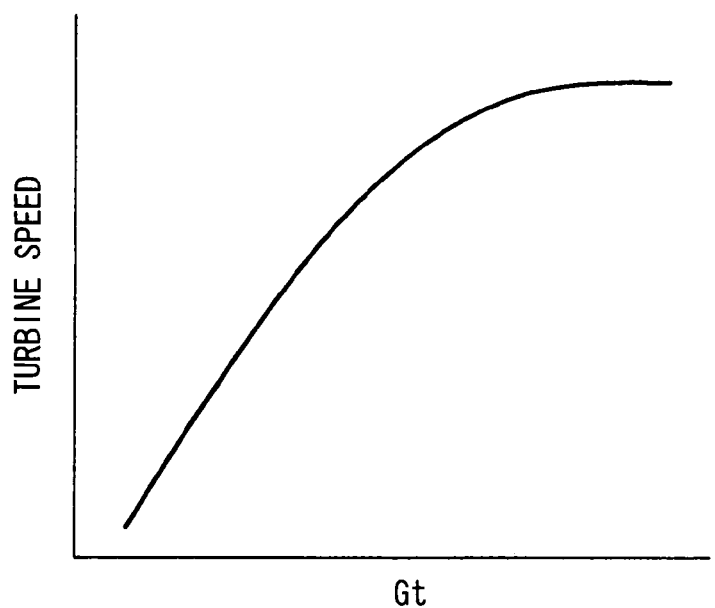
FIG. 6 schematically shows a map of exhaust turbine's rotational speeds.
Figure 7:
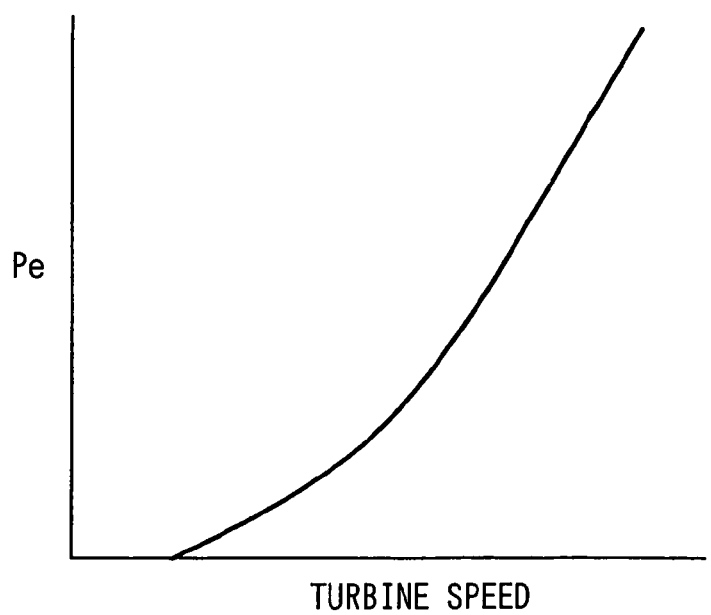
FIG. 7 schematically shows a map of estimated boost pressures according to embodiment 1.

The routine then proceeds to Step 203 to determine whether or not the opening of the WGV 33 is larger than a specified value Ds. As a result, the opening of the WGV 33 may be determined to be larger than the specified value Ds. In this case, the routine proceeds to Step 204. The routine uses maps, equations, and the like for the WGV-passing gas amount Gp as shown in FIG. 5 to calculate the WGV-passing gas amount Gp corresponding to the opening of the WGV 33.

At Step 203, the opening of the WGV 33 may be determined to be smaller than or equal to the specified value Ds. In this case, the routine proceeds to Step 205 to set the WGV-passing gas amount Gp to 0.

After setting the WGV-passing gas amount Gp, the routine proceeds to Step 206. The routine subtracts the WGV-passing gas amount Gp from the intake air amount Ai (exhaust gas amount) detected by the air flow meter 14 to find the turbine-supplied gas amount Gt.

$$\text{Turbine-supplied gas amount } Gt = \text{Intake air amount } Ai\, Ai - WGV\text{-passing gas amount } Gp \qquad (4)$$

The process at Step 206 works as turbine-supplied gas amount Gt calculation means as described in the appended claims.

The routine proceeds to Step 207. The routine uses maps, equations, and the like for the exhaust turbine's rotational speed in FIG. 6 to calculate an exhaust turbine's rotational speed corresponding to the turbine-supplied gas amount Gt. The routine proceeds to Step 208. The routine uses maps, equations, and the like for the estimated boost pressure Pe in FIG. 7 to calculate an estimated boost pressure Pe corresponding to the exhaust turbine's rotational speed. The process at Steps 207 and 208 works as turbine-supplied gas boost pressure estimation means as described in the appended claims.

As mentioned above, the boost pressure estimation routine in FIG. 3 calculates an exhaust turbine's rotational speed in accordance with the turbine-supplied gas amount Gt. The routine calculates the estimated boost pressure Pe in accordance with the exhaust turbine's rotational speed. Further, it may be preferable to directly calculate an estimated boost pressure Pe from the turbine-supplied gas amount Gt by using a map, equations, and the like for the estimated boost pressure Pe. In this case, the turbine-supplied gas amount Gt is assumed to be a parameter.

As mentioned above, embodiment 1 calculates the turbine-supplied gas amount Gt based on the intake air amount Ai and the opening of the WGV 33. The estimated boost pressure Pe is calculated based on the turbine-supplied gas amount Gt. A boost pressure can be accurately estimated without using the boost pressure sensor even under such conditions as to disable detection of boost pressures or degrade the detection accuracy in a system using a conventional boost pressure sensor. It is possible to provide control and processes based on boost pressures. Further, the boost pressure sensor can be omitted from the construction. It is also possible to satisfy demands for decreasing the number of parts and reducing costs.

[Embodiment 2]

Embodiment 2 of the present invention will be described with reference to FIGS. 8 through 17.

As shown in FIGS. 16A and 16B, the intake air amount Ai (exhaust gas amount) of the engine 11 suddenly changes during transient states such as acceleration and deceleration. Compared to a change in the turbine-supplied gas amount Gt, a change in the exhaust turbine's rotational speed is subject to a delay due to inertia of the exhaust turbine 26. Accordingly, a delay occurs in a change in the boost pressure compared to a change in the turbine-supplied gas amount Gt.

Figure 17A:
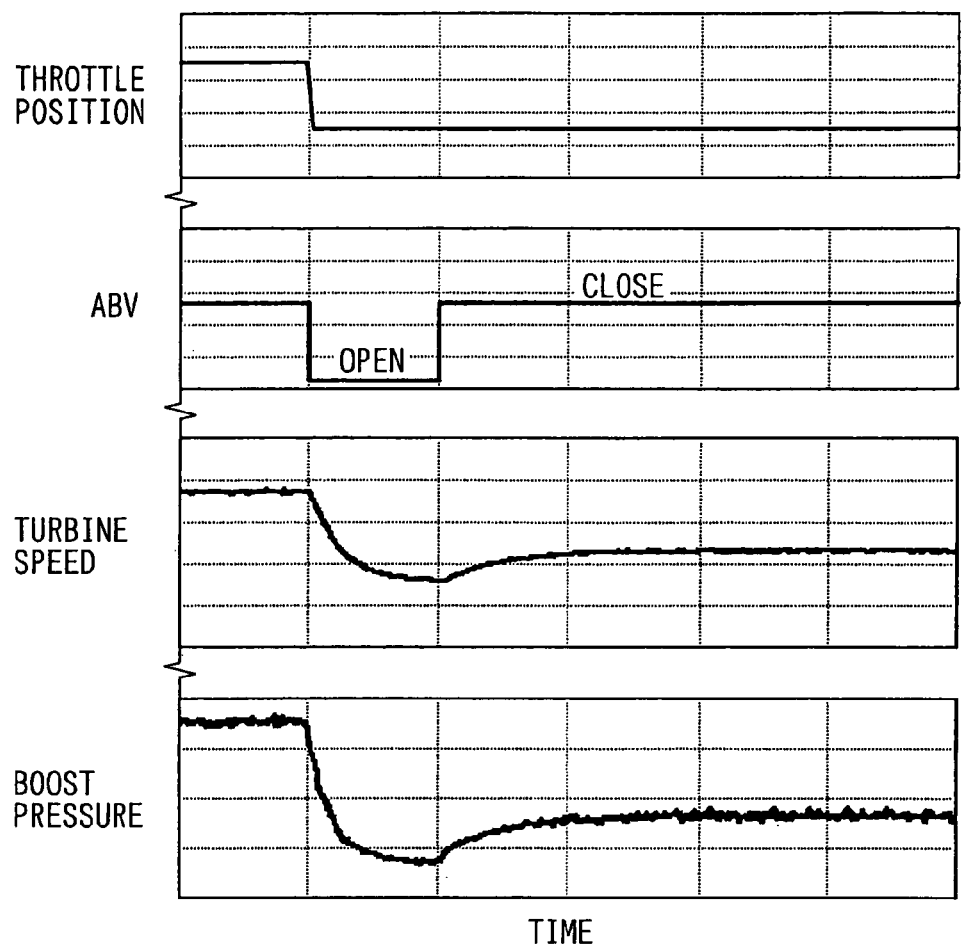
FIG. 17A is a time chart showing the behavior of boost pressure when an ABV is opened.

As shown in FIG. 17A, the boost pressure rises during deceleration from the supercharging state. To prevent this, the ABV 29 is opened to decrease the boost pressure during the deceleration.

Figure 17B:
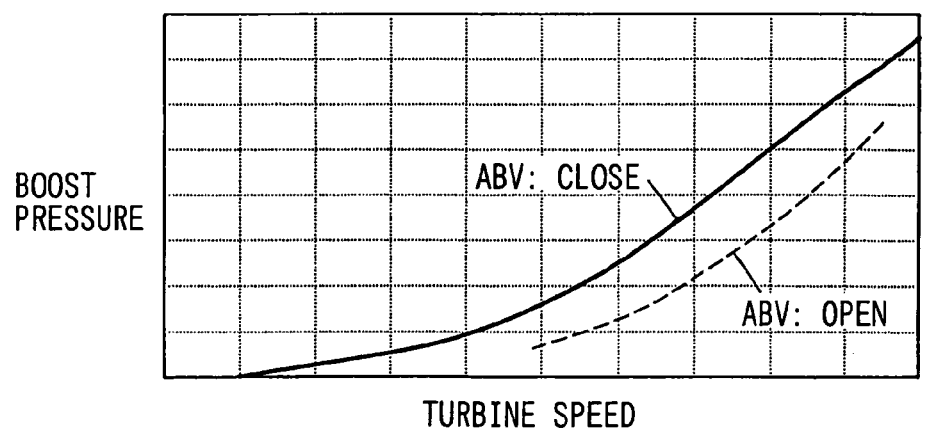
FIG. 17B is a characteristics chart showing relationship between an exhaust turbine's rotational speed and a boost pressure when the ABV is opened and closed.

Further, as shown in FIG. 17B, there may be a difference between the exhaust turbine's rotational speed and the boost pressure when the ABV 29 is opened and closed.

In addition, an IC pressure loss (an intake pressure loss due to the IC 31) changes in accordance with the engine operation state. The boost pressure also changes accordingly.

In consideration for the above-mentioned boost pressure characteristics, the ECU 38 executes boost pressure estimation routines in FIGS. 8 through 11. In this manner, the ECU 38 applies various corrections to calculation of an estimated boost pressure Pe to improve the accuracy of the estimated boost pressure Pe calculation.

[Boost Pressure Estimation Routine]

Figure 8:
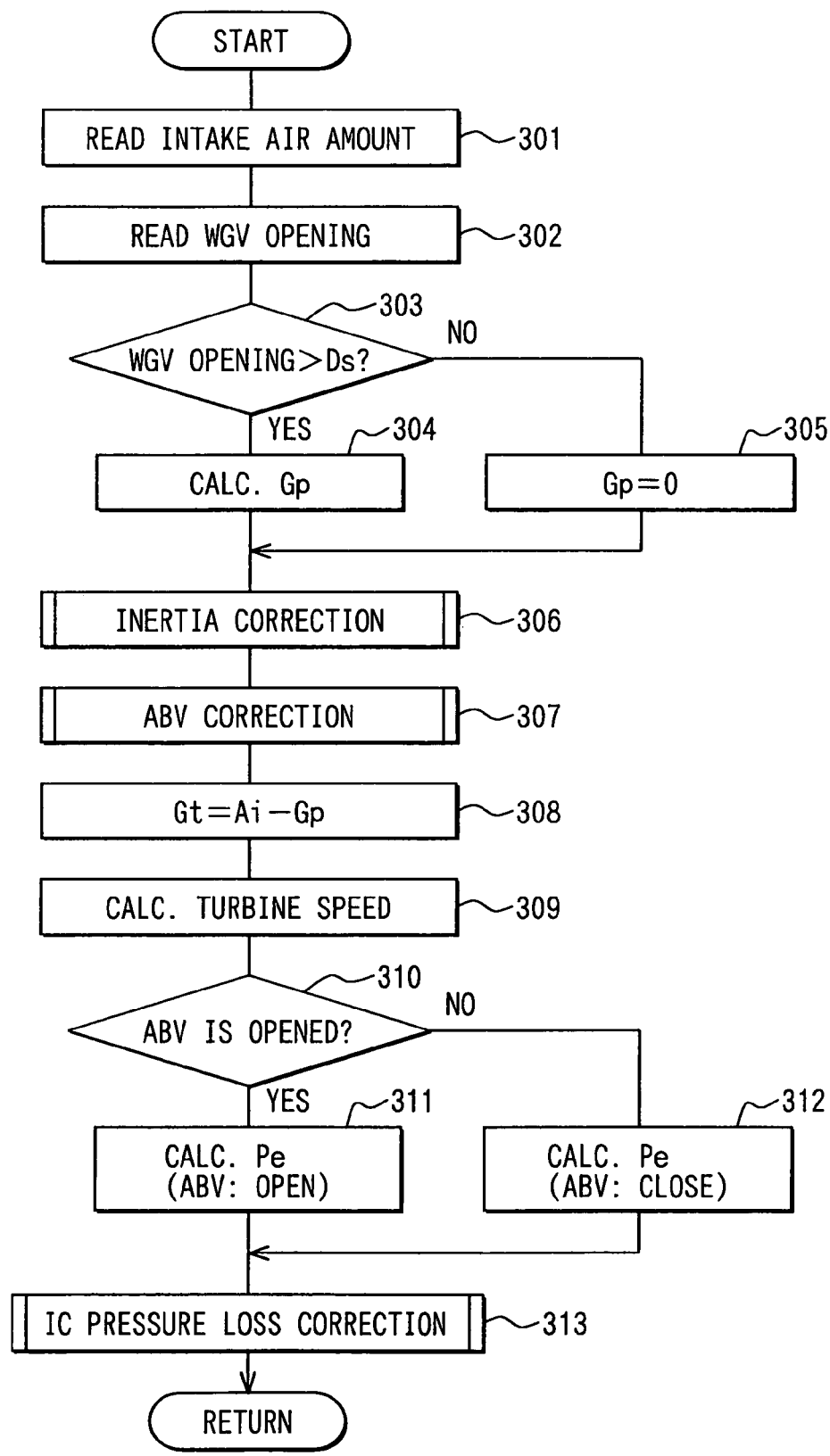
FIG. 8 is a flowchart showing a process flow of a boost pressure estimation routine according to embodiment 2.

The following describes process contents of a boost pressure estimation routine as shown in FIG. 8. When initiated, the routine first reads the intake air amount Ai and the opening of the WGV 33 (Steps 301 and 302). When the opening of the WGV 33 is larger than a specified value, the routine calculates a WGV-passing gas amount Gp corresponding to the opening of the WGV 33. When the opening of the WGV 33 is smaller than or equal to the specified value, the routine sets the WGV-passing gas amount Gp to 0 (Steps 303 through 305).

Figure 9:
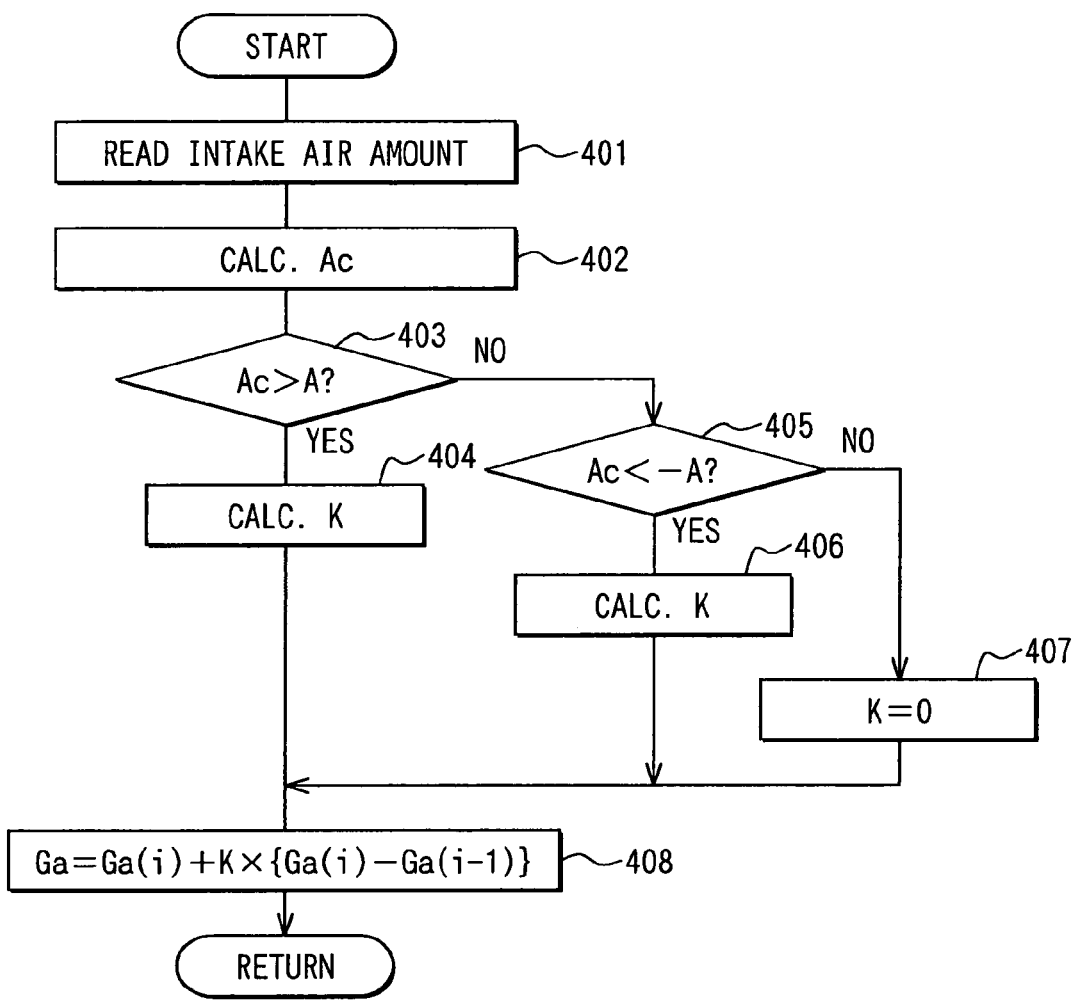
FIG. 9 is a flowchart showing a process flow of an inertia correction routine according to embodiment 2.

The routine proceeds to Step 306 to execute an inertia correction routine to be described in FIG. 9. The routine corrects the intake air amount Ai based on delay time constant K due to an inertia of the exhaust turbine 26. The routine proceeds to Step 307 to execute an ABV correction routine to be described in FIG. 10. The routine corrects the intake air amount Ai based on the opening of the ABV 29.

The routine proceeds to Step 308 to find a turbine-supplied gas amount Gt by subtracting the WGV-passing gas amount Gp from the intake air amount Ai processed by the inertia correction and the ABV correction.

Turbine-supplied gas amount $Gt$=Intake air amount $Ai$−$WGV$-passing gas amount $Gp$ (5)

The routine proceeds to Step 309 to calculate an exhaust turbine's rotational speed corresponding to the turbine-supplied gas amount Gt.

The routine proceeds to Step 310 to determine whether or not the ABV 29 opens. When the ABV 29 is determined to be open, the routine proceeds to Step 311. The routine calculates an estimated boost pressure Pe corresponding to the exhaust turbine's rotational speed by using a map, equations, and the like for the estimated boost pressure Pe during ABV opening indicated by a broken line in FIG. 12.

When it is determined at Step 310 that the ABV 29 is closed, the routine proceeds to Step 312. The routine calculates an estimated boost pressure Pe corresponding to the exhaust turbine's rotational speed by using a map, equations, and the like for the estimated boost pressure Pe during ABV closing indicated by a solid line in FIG. 12.

In this manner, the routine changes the map defining the relationship between the exhaust turbine's rotational speed and the estimated boost pressure Pe depending on whether the ABV 29 is opened or closed. The routine calculates an estimated boost pressure Pe. The routine then proceeds to Step 313 and executes an IC pressure loss correction routine to be described in FIG. 11 to correct the estimated boost pressure Pe in accordance with the IC pressure loss.

[Inertia Correction Routine]

FIG. 9 shows an inertia correction routine as shown at Step 306 in FIG. 8. At Step 401, the routine reads the intake air amount Ai detected by the air flow meter 14. The routine then proceeds to Step 402 to calculate an intake air change amount Ac.

The routine then proceeds to Step 403 and determines whether or not the intake air change amount Ac is larger than specified value A (>0). As a result, it may be determined that the intake air change amount Ac is larger than specified value A. In this case, the routine determines the acceleration and then proceeds to Step 404. The routine calculates delay time constant K due to the inertia of the exhaust turbine 26 in accordance with the intake air amount Ai by using a map, equations, and the like for delay time constant K during acceleration indicated by a solid line in FIG. 13.

At Step 403, however, it may be determined that the intake air change amount Ac is smaller than or equal to specified value A. In this case, the routine proceeds to Step 405 to determine whether or not the intake air change amount Ac is smaller than or equal to a specified value (−A). As a result, it may be determined that the intake air change amount Ac is smaller than or equal to the specified value (−A). In this case, the routine determines the deceleration and then proceeds to Step 406. The routine calculates delay time constant K due to the inertia of the exhaust turbine 26 in accordance with the intake air amount Ai by using a map, equations, and the like for delay time constant K during deceleration indicated by a broken line in FIG. 13.

At Step 403, it may be determined that the intake air change amount Ac is smaller than or equal to specified value A. At Step 405, it may be determined that the intake air change amount Ac is smaller than or equal to specified value (−A). In such a case, the routine determines that the steady state almost takes effect. The routine proceeds to Step 407 and sets the delay time constant K to 0.

After setting the delay time constant K, the routine proceeds to Step 408 to correct the intake air amount Ai using delay time constant K according to the following equation.

$$Ga = Ga(i) + K \times \{Ga(i) - Ga(i-1)\} \quad (6)$$

where Ga is the intake air amount Ai after correction, Ga(i) the detection value for the current intake air amount, and Ga(i−1) the detection value for the previous intake air amount.

Based on delay time constant K due to the inertia of the exhaust turbine 26, the intake air amount Ai is corrected and the turbine-supplied gas amount Gt is corrected.

[ABV Correction Routine]

Figure 10:
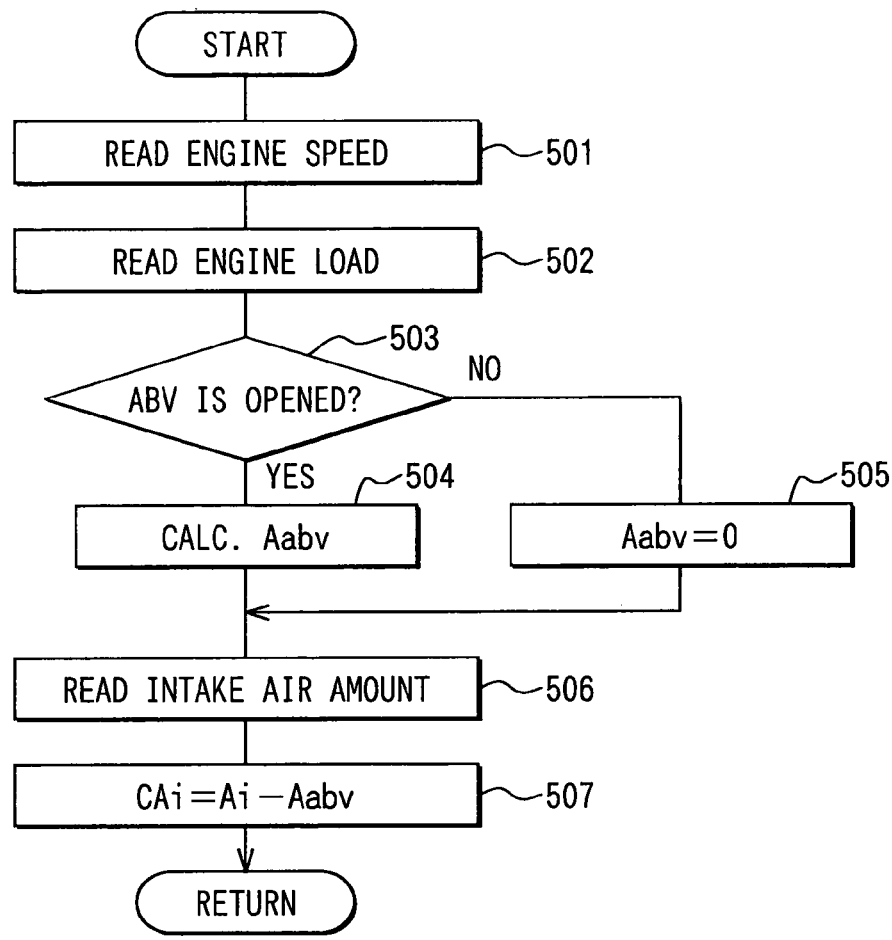
FIG. 10 is a flowchart showing a process flow of an ABV correction routine according to embodiment 2.

FIG. 10 shows an ABV correction routine executed at Step 307 in FIG. 8. At Step 501, the routine reads an engine rotational speed. The routine then proceeds to Step 502 to read engine loads (e.g., intake air amount, throttle opening, and the like).

Figure 14:
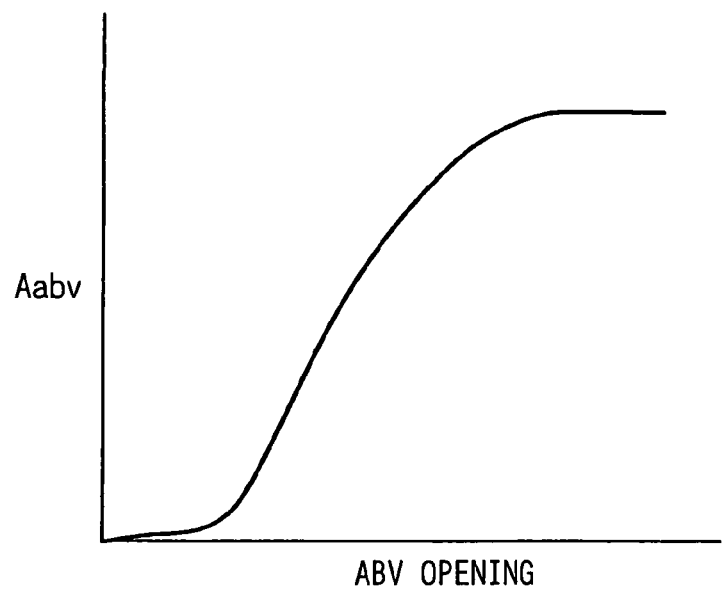
FIG. 14 schematically shows a map of the amount of air passing through ABV.

The routine proceeds to Step 503 to determine whether or not the ABV 29 opens. When the ABV 29 is determined to be opened, the routine proceeds to Step 504. The routine calculates the amount of air passing through ABV according to the opening of the ABV 29, the engine rotational speed, and engine loads by using a map, equations, and the like for the amount of air passing through ABV as shown in FIG. 14. The amount of air passing through ABV is referred to as Aabv. FIG. 14 shows the map for the amount of air passing through ABV. The map assigns amounts of air passing through ABV corresponding to openings of the ABV 29 to engine rotational speeds and engine loads.

When the ABV 29 is determined to be closed at Step 503, the routine proceeds to Step 505 and sets the amount of air passing through ABV to 0.

In this manner, the routine sets the amount of air passing through ABV and then proceeds to Step 506. The routine reads the intake air amount Ai and then proceeds to Step 507. Using the amount of air passing through ABV, the routine corrects the intake air amount Ai according to the following equation.

Corrected intake air amount $CAi$=Intake air amount
$Ai$−Amount of air passing through $ABV$ ($Aabv$)  (7)

This equation corrects the intake air amount Ai according to the opening of the ABV 29. The turbine-supplied gas amount Gt is corrected to correct the estimated boost pressure Pe.

[IC Pressure Loss Correction Routine]

Figure 11:
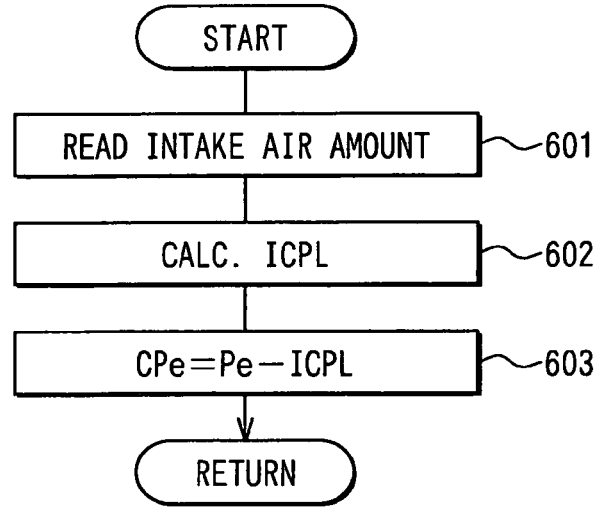
FIG. 11 is a flowchart showing a process flow of an IC correction routine according to embodiment 2.
Figure 12:
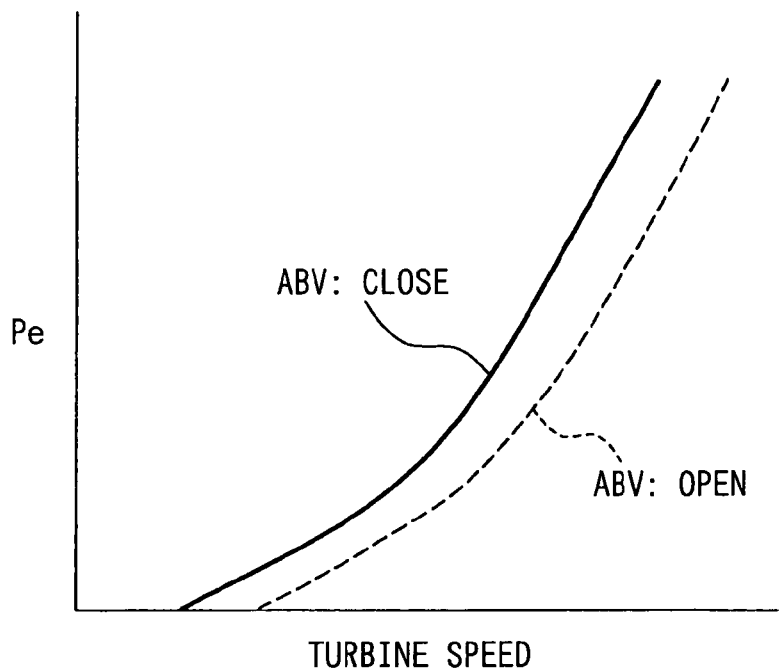
FIG. 12 schematically shows a map of estimated boost pressures according to embodiment 2.
Figure 13:
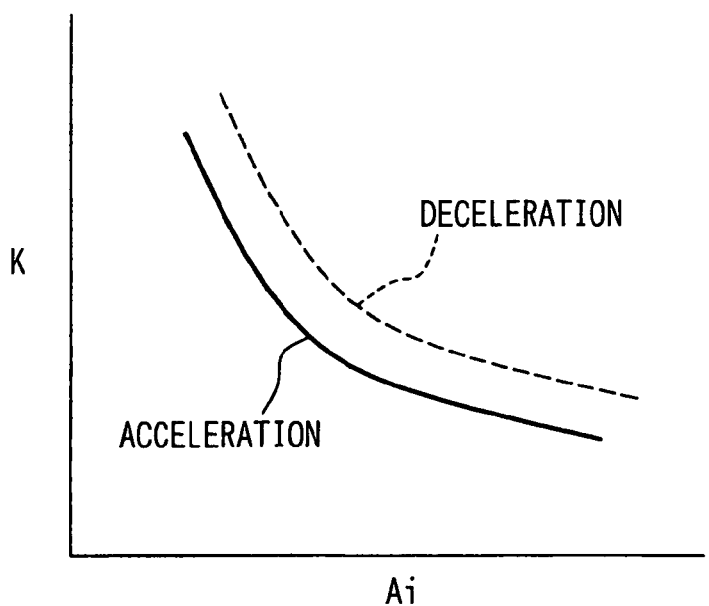
FIG. 13 schematically shows a map of delay time constants.
Figure 15:
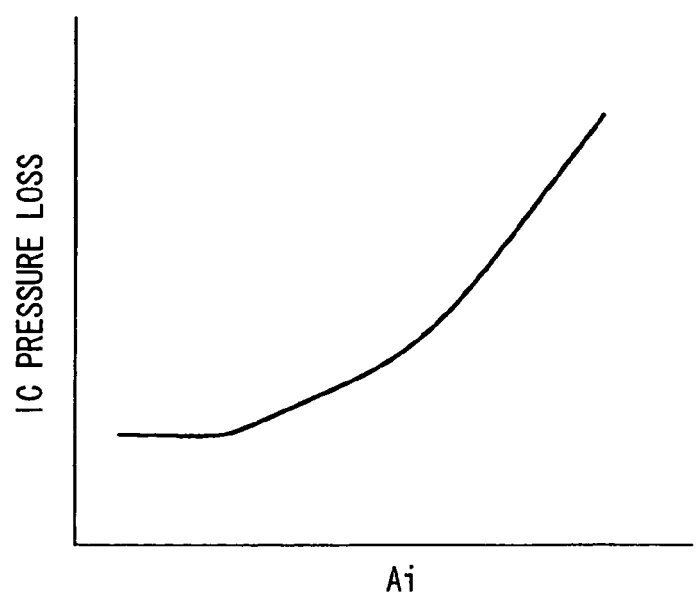
FIG. 15 schematically shows a map of IC pressure losses.

FIG. 11 shows an IC pressure loss correction routine executed at Step 313 in FIG. 8. At Step 601, the routine reads the intake air amount Ai and then proceeds to Step 602. The routine calculates an IC pressure loss ICPL according to the intake air amount Ai by using a map, equations, and the like for the IC pressure loss ICPL as shown in FIG. 15.

The routine then proceeds to Step 603 and uses the IC pressure loss to calculate the estimated boost pressure Pe according to the following equation.

Corrected estimated boost pressure $CPe$=Estimated
boost pressure $Pe$−IC pressure loss $ICPL$  (8)

As mentioned above, embodiment 2 calculates delay time constant K due to the inertia of the exhaust turbine 26 during the acceleration or deceleration. The turbine-supplied gas amount Gt is corrected based on delay time constant K. The estimated boost pressure Pe can be accurately calculated based on the turbine-supplied gas amount Gt. The turbine-supplied gas amount Gt is corrected in consideration for a delay in the exhaust turbine's rotational speed (i.e., a delay in the boost pressure) due to the inertia of the exhaust turbine 26. Accordingly, it is possible to improve the calculation accuracy of the estimated boost pressure Pe during transient states such as acceleration and deceleration.

Embodiment 2 corrects the intake air amount Ai by using delay time constant K to correct the turbine-supplied gas amount Gt. Delay time constant K may be used to directly correct the turbine-supplied gas amount Gt. Moreover, delay time constant K may be used to directly correct the exhaust turbine's rotational speed or the estimated boost pressure Pe.

Embodiment 2 corrects the estimated boost pressure Pe based on the opening of ABV 29. The estimated boost pressure Pe can be corrected in response to a decrease in the boost pressure correspondingly to the opening of the ABV 29. It is possible to accurately calculate the estimated boost pressure Pe when the ABV 29 is opened.

Further, embodiment 2 calculates the estimated boost pressure Pe by changing the relationship between the exhaust turbine's rotational speed and the estimated boost pressure Pe depending on whether the ABV 29 is opened or closed. Depending on whether the ABV 29 is opened or closed, a difference occurs in the relationship between the exhaust turbine's rotational speed and the boost pressure. In accordance with the difference, the estimated boost pressure Pe can be corrected by changing the relationship between the exhaust turbine's rotational speed and the estimated boost pressure Pe. The estimated boost pressure Pe can be accurately calculated independently of how the ABV 29 is operated.

Further, embodiment 2 calculates an IC pressure loss (an intake pressure loss due to the IC 31) based on engine's operation states (e.g., the intake air amount). The estimated boost pressure Pe is corrected according to the IC pressure loss. The estimated boost pressure Pe can be corrected in response to a change in the IC pressure loss depending on engine's operation states. The estimated boost pressure Pe can be more accurately calculated.

[Embodiment 3]

Figure 18:
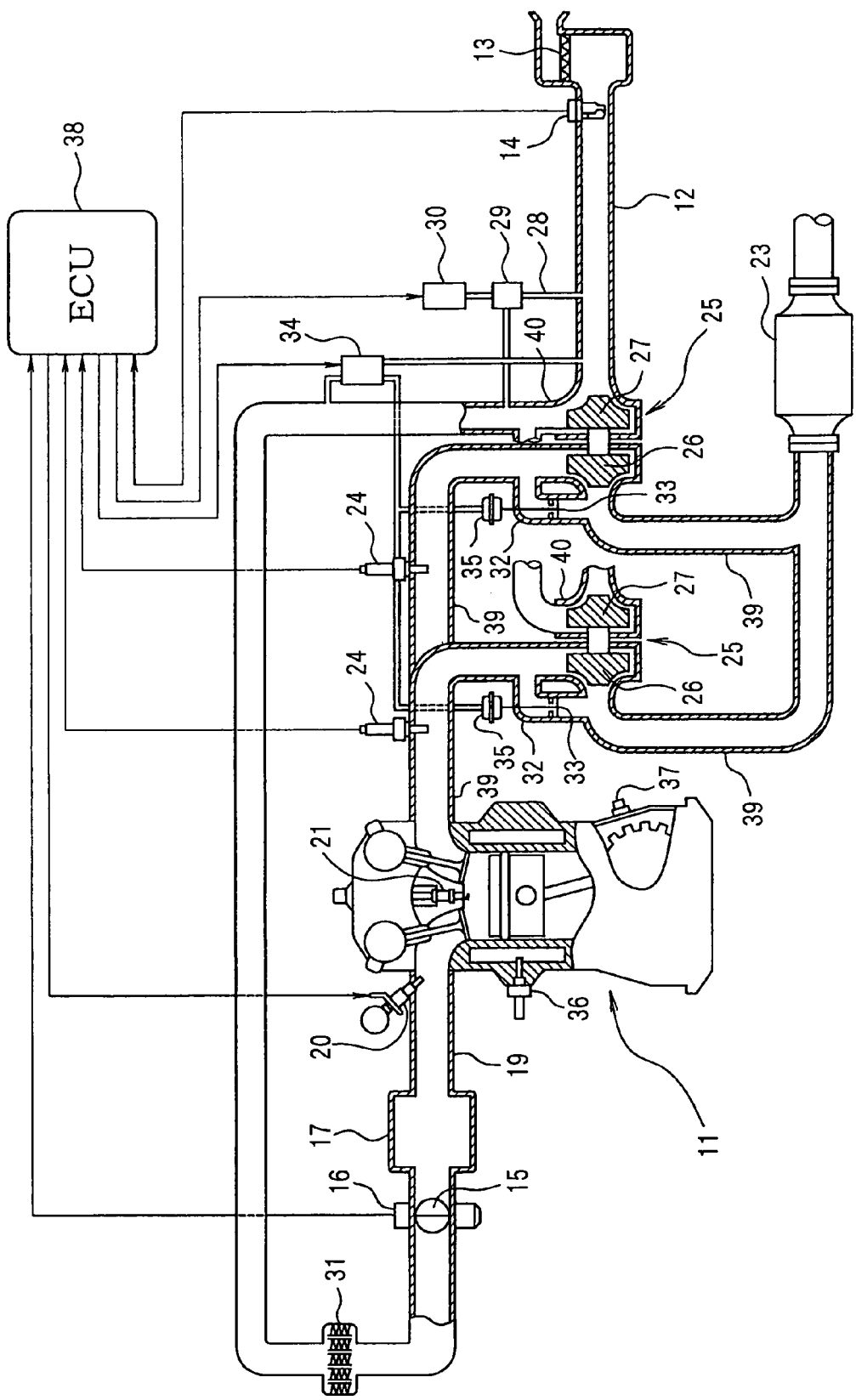
FIG. 18 schematically shows the overall construction of an engine control system according to embodiment 3 of the present invention.
Figure 19:
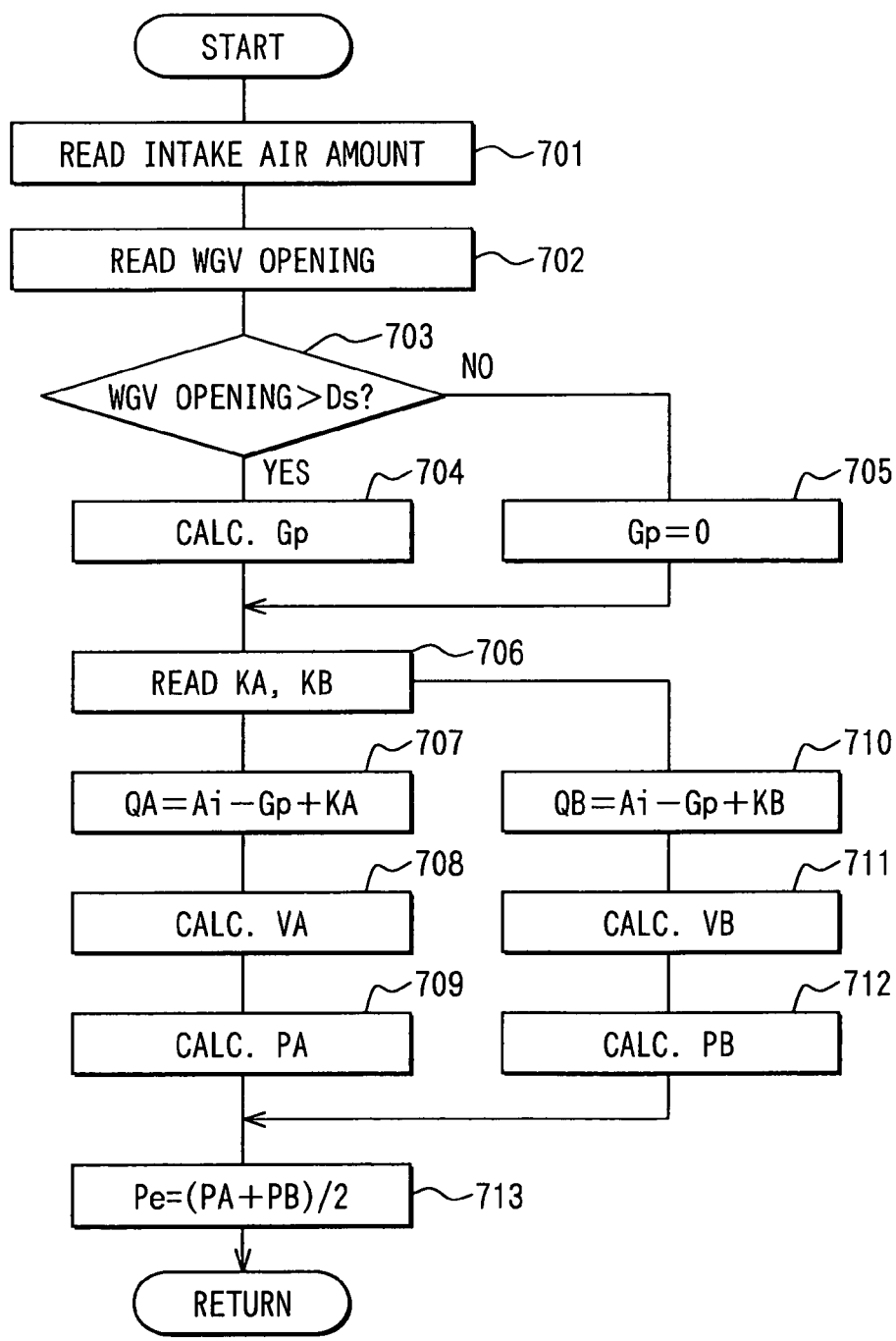
FIG. 19 is a flowchart showing a process flow of a boost pressure estimation routine according to embodiment 3.

The following describes embodiment 3 of the present invention with reference to FIGS. 18 and 19.

As shown in FIG. 18, embodiment 3 provides two exhaust pipes 39 (exhaust pipes) corresponding to two cylinder groups. An air-fuel ratio sensor 24 is provided for the exhaust pipe 39 in each cylinder group. Corresponding to the two exhaust pipes 39, two exhaust turbine superchargers 25 are mounted on the engine 11. Each supercharger 25 is provided with the exhaust turbine 26 in each of the two exhaust pipes 39. A branch intake pipe 40 (intake pipe) branches into two portions between the air flow meter 14 and the throttle valve 15 in the intake pipe 12. Each branch intake pipe 40 is provided with the compressor 27. The exhaust bypass pipe 32 is provided for each of the two exhaust pipes 39. Each exhaust bypass pipe 32 is provided with the WGV 33 and an actuator 35. The common VSV 34 for WGV controls the WGVs 33 and the actuators 35. The remainder of the system construction is the same as that for the above-mentioned embodiment 1.

The ECU 38 executes an air-fuel ratio FB control routine (not shown) to function as air-fuel ratio feedback control means. The air-fuel ratio sensor 24 detects an air-fuel ratio of the exhaust gas for each cylinder group. The ECU 38 calculates the air-fuel ratio FB correction amount so that the detected air-fuel ratio matches the target air-fuel ratio.

The air-fuel ratio FB correction amount for each cylinder group is a parameter that reflects the intake air amount Ai for each cylinder group (i.e., the exhaust gas amount exhausted to each exhaust pipe 39). As a result, the air-fuel ratio FB correction amount becomes a parameter that reflects the turbine-supplied gas amount Gt for each exhaust pipe 39.

The ECU 38 executes a boost pressure estimation routine as shown in FIG. 19. The ECU 38 thus calculates the turbine-supplied gas amount Gt for each exhaust pipe 39 based on the intake air amount Ai, the opening of the WGV 33, and the air-fuel ratio FB correction amount for each cylinder group. The ECU 38 calculates the estimated boost pressure Pe for each of the superchargers 25 based on the turbine-supplied gas amounts Gt. The ECU 38 finds an average value of the estimated boost pressures Pe as the estimated boost pressure Pe.

The following describes process contents of the boost pressure estimation routine in FIG. 19. For convenience of description, the two cylinder groups are represented as "group A" and "group B." When initiated, the routine first reads the intake air amount Ai and the opening of the WGV 33 (Steps 701 and 702). When the opening of the WGV 33 is larger than a specified value Ds, the routine calculates a WGV-passing gas amount Gp corresponding to the opening of the WGV 33. When the opening of the WGV 33 is smaller than or equal to the specified value Ds, the routine sets the WGV-passing gas amount Gp to 0 (Steps 703 through 705).

The routine proceeds to Step 706 to read air-fuel ratio FB correction amount KA for group A and air-fuel ratio FB correction amount KB for group B. At Steps 707 through 712, the routine calculates an estimated boost pressure Pe for each supercharger 25 in each cylinder group as follows.

The routine calculates estimated boost pressure PA generated by the supercharger 25 for group A as follows. At Step 707, the routine calculates turbine-supplied gas amount QA for the exhaust pipe 39 in group A using the following equation. The equation uses the intake air amount Ai (e.g., a half of the intake air amount Ai detected by the air flow meter 14), the WGV-passing gas amount Gp, and air-fuel ratio FB correction amount KA in group A.

Turbine-supplied gas amount $QA$=Intake air amount $Ai$−$WGV$-passing gas amount $Gp$+Air-fuel ratio FB correction amount $KA$ (9)

The routine proceeds to Step 708 to calculate exhaust turbine's rotational speed VA corresponding to turbine-supplied gas amount QA. The routine proceeds to Step 709 to calculate estimated boost pressure PA corresponding to exhaust turbine's rotational speed VA.

On the other hand, the routine calculates estimated boost pressure PB generated by the supercharger 25 for group B as follows. At Step 710, the routine calculates turbine-supplied gas amount QB for the exhaust pipe 39 in group B using the following equation. The equation uses the intake air amount Ai (e.g., a half of the intake air amount detected by the air flow meter 14), the WGV-passing gas amount Gp, and air-fuel ratio FB correction amount KB in group B.

Turbine-supplied gas amount $QB$=Intake air amount $Ai$−$WGV$-passing gas amount $Gp$+Air-fuel ratio FB correction amount $KB$ (10)

The routine proceeds to Step 711 to calculate exhaust turbine's rotational speed VB corresponding to turbine-supplied gas amount QB. The routine proceeds to Step 712 to calculate estimated boost pressure PB corresponding to exhaust turbine's rotational speed VB.

The routine calculates estimated boost pressures PA and PB for each supercharger 25. The routine then proceeds to Step 13 to find an average value of estimated boost pressures PA and PB as a final estimated boost pressure Pe.

Estimated boost pressure $Pe$=(Estimated boost pressure $PA$+Estimated boost pressure $PB$)/2 (11)

The above-mentioned embodiment 3 uses the air-fuel ratio FB correction amount for each cylinder group to calculate the turbine-supplied gas amount Gt for each exhaust pipe 39. Even though the exhaust pipes 39 cause variations in turbine-supplied gas amounts Gt, the turbine-supplied gas amount Gt can be accurately calculated for each exhaust pipe 39. In this manner, an estimated boost pressure Pe can be calculated for each supercharger 25 to accurately calculate the final estimated boost pressure Pe.

Embodiment 3 uses the intake air amount Ai, the opening of the WGV 33, and the air-fuel ratio FB correction amount for group A to calculate the turbine-supplied gas amount Gt in group A. In addition, embodiment 3 uses the intake air amount Ai, the opening of the WGV 33, and the air-fuel ratio FB correction amount for group B to calculate the turbine-supplied gas amount Gt in group B. Further, an average turbine-supplied gas amount Gt may be calculated based on the intake air amount Ai and the opening of the WGV 33. The average turbine-supplied gas amount Gt may be corrected with the air-fuel ratio FB correction amount for group A to find the turbine-supplied gas amount Gt for group A. The average turbine-supplied gas amount Gt may be corrected with the air-fuel ratio FB correction amount for group B to find the turbine-supplied gas amount Gt for group B.

What is claimed is:

1. A boost pressure estimation apparatus for an internal combustion engine with a super charger and a waste gate valve, the supercharger using an exhaust pressure to drive an exhaust turbine provided for an exhaust pipe of an internal combustion engine and to drive a compressor provided for an intake pipe to supply air into a cylinder, the waste gate valve opening and/or closing an exhaust bypass pipe to bypass the exhaust turbine, the boost pressure estimation apparatus comprising:

a means for detecting intake air amount for detecting an intake air amount of an internal combustion engine;

a turbine-supplied gas amount calculation means for calculating an exhaust gas amount supplied to the exhaust turbine (hereafter referred to as a "turbine-supplied gas amount") based on an intake air amount detected by the means for detecting intake air amount and opening of the waste gate valve; and a boost pressure estimation means for calculating an estimated value of the supercharger boost pressure (hereafter referred to as an "estimated boost pressure") based on the turbine-supplied gas amount.

2. The boost pressure estimation apparatus according to claim 1, wherein the turbine-supplied gas amount calculation means, during acceleration or deceleration of an internal combustion engine, calculates a delay time constant due to the inertia of the exhaust turbine based on an intake air amount detected by the means for detecting intake air amount and corrects the turbine-supplied gas amount based on the delay time constant.

3. The boost pressure estimation apparatus according to claim 1, further comprising:

an inter-cooler cooling an intake air pressurized by the supercharger, wherein the boost pressure estimation means calculates an intake pressure loss due to the inter-cooler based on an operation state of an internal combustion engine and corrects the estimated boost pressure based on the intake pressure loss.

4. The boost pressure estimation apparatus according to claim 1, further comprising:
an air bypass valve opening and/or closing an intake bypass pipe which bypasses the compressor,
wherein the boost pressure estimation means corrects the estimated boost pressure based on opening of the air bypass valve.

5. The boost pressure estimation apparatus according to claim 1,
wherein each of a plurality of exhaust pipes provided for a plurality of cylinder groups of an internal combustion engine is provided with the supercharging system and an air-fuel ratio sensor to detect an air-fuel ratio of exhaust gas;
wherein air-fuel ratio feedback control means is provided for calculating an air-fuel ratio feedback correction amount so as to establish a match between an exhaust gas air-fuel ratio detected by the air-fuel ratio sensor for each cylinder group and a target air-fuel ratio; and
wherein the turbine-supplied gas amount calculation means calculates the turbine-supplied gas amount for each exhaust pipe based on an intake air amount detected by the means for detecting intake air amount, opening of the waste gate valve, and an air-fuel ratio feedback correction amount in each cylinder group.

6. The boost pressure estimation apparatus according to claim 1,
wherein boost pressure control means is provided for calculating a target boost pressure based on an operation state of an internal combustion engine and controlling opening of the waste gate valve so that the estimated boost pressure matches the target boost pressure.

7. The boost pressure estimation apparatus according to claim 1,
wherein the boost pressure estimation means calculates a rotational speed of the exhaust turbine based on the turbine-supplied gas amount and calculates the estimated boost pressure based on a rotational speed of the exhaust turbine.

8. The boost pressure estimation apparatus according to claim 7, further comprising:
an air bypass valve opening and/or closing an intake bypass pipe which bypasses the compressor,
wherein the boost pressure estimation means calculates the estimated boost pressure based on a rotational speed of the exhaust turbine and, at this time, changes relationship between the rotational speed of the exhaust turbine and the estimated boost pressure according to an operation state of the air bypass valve to correct the estimated boost pressure.

9. A boost pressure estimation apparatus for an internal combustion engine with a super charger and a waste gate valve, the supercharger using an exhaust pressure to drive an exhaust turbine provided for an exhaust pipe of an internal combustion engine and to drive a compressor provided for an intake pipe to supply air into a cylinder, the waste gate valve opening and/or closing an exhaust bypass pipe to bypass the exhaust turbine, the boost pressure estimation apparatus comprising:
an intake air amount detector;
a turbine-supplied gas amount calculator that calculates an exhaust gas amount supplied to the exhaust turbine based on an intake air amount detected by the intake air amount detector and an opening amount of the waste gate valve; and
an estimated supercharger boost pressure calculator that calculates an estimated value of the supercharger boost pressure based on the turbine-supplied gas amount.

10. The boost pressure estimation apparatus according to claim 9, further comprising:
an inter-cooler cooling an intake air pressurized by the supercharger,
wherein the estimated boost pressure calculator calculates an intake pressure loss due to the inter-cooler based on an operation state of an internal combustion engine and corrects the estimated boost pressure based on the intake pressure loss.

11. The boost pressure estimation apparatus according to claim 9, further comprising:
an air bypass valve opening and/or closing an intake bypass pipe which bypasses the compressor,
wherein the estimated boost pressure calculator corrects the estimated boost pressure based on opening of the air bypass valve.

12. The boost pressure estimation apparatus according to claim 9, further comprising:
an air bypass valve opening and/or closing an intake bypass pipe which bypasses the compressor,
wherein the estimated boost pressure calculator calculates a rotational speed of the exhaust turbine based on the turbine-supplied gas amount and calculates the estimated boost pressure based on a rotational speed of the exhaust turbine, and
wherein the estimated boost pressure calculator calculates the estimated boost pressure based on a rotational speed of the exhaust turbine and, at this time, changes relationship between the rotational speed of the exhaust turbine and the estimated boost pressure according to an operation state of the air bypass valve to correct the estimated boost pressure.

13. A method of estimating boost pressure for an internal combustion engine with a super charger and a waste gate valve, the supercharger using an exhaust pressure to drive an exhaust turbine provided for an exhaust pipe of an internal combustion engine and to drives a compressor provided for an intake pipe to supply air into a cylinder, the waste gate valve opening and/or closing an exhaust bypass pipe to bypass the exhaust turbine, the boost pressure estimation method comprising:
detecting intake air amount for detecting an intake air amount of an internal combustion engine;
calculating an exhaust gas amount supplied to the exhaust turbine (hereafter referred to as a "turbine-supplied gas amount") based on a detected intake air amount and an opening amount of the waste gate valve; and
calculating an estimated value of the supercharger boost pressure (hereafter referred to as an "estimated boost pressure") based on the turbine-supplied gas amount.

14. The method according to claim 13, further comprising:
calculating a rotational speed of the exhaust turbine based on the turbine-supplied gas amount, and
calculating the estimated boost pressure based on a rotational speed of the exhaust turbine.

15. The method according to claim 13, further comprising:

calculating, during acceleration or deceleration of an internal combustion engine, a delay time constant due to the inertia of the exhaust turbine based on a detected intake air amount, and correcting the turbine-supplied gas amount based on the delay time constant.

16. The method according to claim 13, comprising:

an inter-cooler cooling an intake air pressurized by the supercharger, calculating intake pressure loss due to the inter-cooler based on an operation state of an internal combustion engine, and correcting the estimated boost pressure based on the intake pressure loss.

17. The method according to claim 13, comprising:

an air bypass valve opening and/or closing an intake bypass pipe which bypasses the compressor, and correcting the estimated boost pressure based on opening of the air bypass valve.

18. The method according to claim 13, comprising:

an air bypass valve opening and/or closing an intake bypass pipe which bypasses the compressor, calculating the estimated boost pressure based on a rotational speed of the exhaust turbine and, at this time, changes relationship between the rotational speed of the exhaust turbine and the estimated boost pressure according to an operation state of the air bypass valve to correct the estimated boost pressure.

19. A method according to claim 13, wherein each of a plurality of exhaust pipes provided for a plurality of cylinder groups of an internal combustion engine is provided with the supercharging system and an air-fuel ratio sensor to detect an air-fuel ratio of exhaust gas; comprising:

calculating an air-fuel ratio feedback correction amount so as to establish a match between an exhaust gas air-fuel ratio detected by the air-fuel ratio sensor for each cylinder group and a target air-fuel ratio; and calculating the turbine-supplied gas amount for each exhaust pipe based on an intake air amount detected by the means for detecting intake air amount, opening of the waste gate valve, and an air-fuel ratio feedback correction amount in each cylinder group.

20. A method according to claim 13, further comprising calculating a target boost pressure based on an operation state of an internal combustion engine and controlling opening of the waste gate valve so that the estimated boost pressure matches the target boost pressure.

* * * * *